(12) United States Patent
Qiu

(10) Patent No.: US 8,418,653 B2
(45) Date of Patent: Apr. 16, 2013

(54) PET BAG RACK

(76) Inventor: Bin Qiu, Yancheng (CN)

( * ) Notice: Subject to any disclaimer, the term of this patent is extended or adjusted under 35 U.S.C. 154(b) by 195 days.

(21) Appl. No.: 12/967,895

(22) Filed: Dec. 14, 2010

(65) Prior Publication Data

US 2011/0079182 A1  Apr. 7, 2011

Related U.S. Application Data

(63) Continuation-in-part of application No. PCT/CN2009/072378, filed on Jun. 22, 2009.

(30) Foreign Application Priority Data

May 13, 2009  (CN) .......................... 2009 1 0027922

(51) Int. Cl.
*A01K 1/03* (2006.01)
(52) U.S. Cl.
USPC .......................................... 119/499; 119/496
(58) Field of Classification Search .................. 119/474, 119/482, 493, 494, 496, 498, 499, 504, 513, 119/514
See application file for complete search history.

(56) References Cited

U.S. PATENT DOCUMENTS

| | | | | |
|---|---|---|---|---|
| 5,018,918 A | * | 5/1991 | Jacobs et al. | 410/145 |
| 5,697,111 A | * | 12/1997 | Dillner et al. | 5/99.1 |
| 5,819,342 A | * | 10/1998 | Williams | 5/99.1 |
| 6,305,037 B1 | * | 10/2001 | Cheng | 5/99.1 |
| 6,336,234 B1 | * | 1/2002 | Kuo | 5/99.1 |
| 6,533,135 B1 | * | 3/2003 | Ford et al. | 212/294 |
| 6,725,475 B1 | * | 4/2004 | Chen | 5/98.1 |
| 7,380,521 B2 | * | 6/2008 | Morton et al. | 119/499 |
| 7,594,285 B2 | * | 9/2009 | Chen et al. | 5/99.1 |
| 2005/0229866 A1 | | 10/2005 | Simpson et al. | |
| 2006/0150917 A1 | | 7/2006 | Morton et al. | |

FOREIGN PATENT DOCUMENTS

| | | |
|---|---|---|
| CN | 2872838 | 2/2007 |
| CN | 200938783 | 8/2007 |
| CN | 200956751 | 10/2007 |
| CN | 201036287 | 3/2008 |
| CN | 101375671 A | 3/2009 |
| CN | 201199840 | 3/2009 |

OTHER PUBLICATIONS

International Search Report, dated Feb. 11, 2010, corresponding to PCT/CN2009/072378, 2 pages.

* cited by examiner

*Primary Examiner* — Rob Swiatek
*Assistant Examiner* — Ebony Evans
(74) *Attorney, Agent, or Firm* — Christie, Parker & Hale, LLP

(57) ABSTRACT

A pet bag rack, comprising horizontal bars and two groups of relatively disposed side bars. One end of each group of the side bars is hinged to one end of the horizontal bars, and the other end of the side bars is pivoted to a pivot seat. The side bars may rotate around the pivot seat; a limiting and fixing device comprising a revolving shaft, a knob and a limiting turntable is mounted on the pivot seat. The revolving shaft runs through the center of the pivot seat. The knob is arranged at the inner end of the revolving shaft. The limiting turntable is slipped over the revolving shaft.

14 Claims, 4 Drawing Sheets

PET BAG RACK

CROSS-REFERENCE TO RELATED APPLICATION(S)

This application is a Continuation-In-Part of International Patent Application Number PCT/CN2009/072378, filed on Jun. 22, 2009, which claims priority of Chinese Patent Application Number 200910027922.0, filed on May 13, 2009, the entire contents of both of which are incorporated herein by reference.

FIELD OF THE INVENTION

The present invention relates to a product for pets, particularly to a pet bag rack.

BACKGROUND OF THE INVENTION

For easy carrying and transport, most of the present pet bag racks are foldable. For example, Chinese patent CN101375671A discloses a pet bag rack. It comprises a square underframe. Two inverted U-shaped side frames are hinged symmetrically on the two sides of the square underframe. Upper bars are hinged symmetrically on the two sides of the upper part of a U-shaped side frame, and upper bars are hinged in the corresponding positions of the other U-shaped frame, thus two opposite upper bars may be spliced to form a long bar. A jack is arranged on one of the two opposite upper bars, a notch is arranged on the surface of the upper bar in the section of the jack, a spring is installed inside the jack, a sleeve is disposed on the upper bar with a jack, and a screw hole is arranged on the sleeve, which works together with the notch to realize connection with the corresponding upper bars. The components of this invention won't fall apart after disassembly. Moreover, it achieves the effect of conveniently adjusting its dimensions. Chinese patent CN201199840Y discloses a round-top single-brace pet bag rack, which comprises bottom frame, side frame and brace. On a group of opposite sides of the rectangular bottom frame, ∩-shaped side frames are symmetrically installed through rivets and can revolve around the rivets. The brace is composed of two spliced short bars. The splicing ends of the two short bars are respectively provided with a convex joint and a concave joint. The other ends of the two short bars are respectively connected to the top of the side frames with rivets. A handlebar is installed around the splicing end of one of the above-mentioned short bars. A bolt is disposed on the handlebar and received by the sliding groove of this short bar. In the cavity of the short bar, a spring is provided to withstand the bolt. This round-top single-brace pet bag rack saves material, reduces weight and facilitates use, storage and transport. The above-mentioned two existing pet bag racks are detachable, foldable and facilitate transport and carrying, but as their side frames all adopt an ∩-shaped integral structure, they still have relatively larger volume when folded, even though it has been reduced compared with unfolded, and its transport and carrying are still inconvenient.

SUMMARY OF THE INVENTION

Purpose: In order to overcome the shortcomings of the prior art, the present invention provides an integral pet bag that can be assembled without any tool and has small volume when folded, thus can be easily transported and carried.

Technical Scheme: The technical schemes that the present invention adopts to solve its technical problems are as following:

A pet bag rack, comprising horizontal bars and two groups of relatively disposed side bars, wherein one end of each group of the side bars is hinged to one end of the horizontal bars, and it further comprises a pair of relatively disposed pivot seats. The other end of each group of the side bars is pivoted to a pivot seat; they together with the horizontal bars form a unity. Here, the side bars may revolve around the pivot seat, so as to adjust the side bars to be parallel with or be perpendicular to the horizontal bars. On the pivot seat, a limiting and fixing device is also disposed to maintain the side bars in an unfolded state or a folded state.

The horizontal bars are sleeve jointed telescopic bars, and the side bars are sleeve jointed telescopic bars.

A sliding sleeve is disposed on each side bar in a slidable manner, a compression spring is disposed between two adjoining sliding sleeves, a movable block is arranged inside the pivot seat, and the movable blocks are respectively connected to the sliding sleeve with a draw bar. The pivot seat also contains a slot. A clip is disposed on the movable block, the clip may be fastened inside the slot, and a button that corresponds to the position of the slot and is used to open the clip is disposed on the outside of the pivot seat.

Furthermore, the limiting and fixing device comprises a revolving shaft, knob and limiting turntable. The revolving shaft runs through the center of the pivot seat. The knob is arranged at an inner end of the revolving shaft. The limiting turntable is slipped over the revolving shaft.

Furthermore, limiting clips are disposed around the limiting turntable, and locating pins and locating holes are respectively arranged on the contact surface between the knob and the pivot seat.

Furthermore, a spring seat is disposed on the revolving shaft, a spring is arranged between the spring seat and the pivot seat, and the spring presses the knob tightly onto the external surface of the pivot seat.

Furthermore, there are four side bars and they are coupled into an X shape through the pivot seat.

Beneficial Effects: Compared with the prior art, the beneficial effects of the present invention are:

1. The pet bag rack of the present invention adopts horizontal bars, side bars and pivot seats which form a unity through hinge without using any special tool. The pet bag rack is user friendly and better than ordinary bag racks in this point. Furthermore, the side bars are connected through pivot seats. When folded, side bars are parallel with the horizontal bars, the side bars on the two sides are arranged symmetrically, which results in greatly saving the space, significantly reducing the volume when folded and facilitating transport and carrying. The present invention is characterized by convenient use, easy processing and low cost.
2. The horizontal bars and side bars of the present invention are both telescopic bars. The volume will be further reduced to one half after folding, which results in greatly saving space and facilitating transport and carrying.
3. Sliding sleeves are disposed on the side bars of the present invention and adopt the mode of draw bar and compression spring. The bag rack may be automatically unfolded or folded. The structure is simple. The use is faster and more convenient.

BRIEF DESCRIPTION OF THE DRAWINGS

The accompanying drawings, together with the specification, illustrate the present invention, and, together with the description, serve to explain the principles of the present invention.

DESCRIPTION OF REFERENCE NUMBER IN THE DRAWINGS

Figure 1:
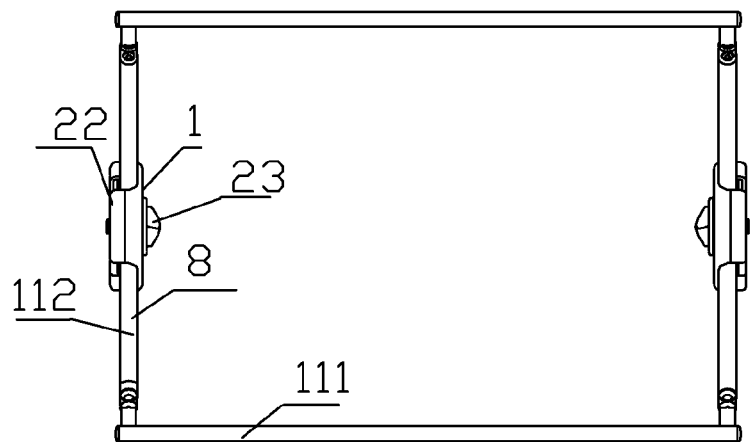
FIG. 1 is a structural schematic view of the present invention in an unfolded state.
Figure 2:
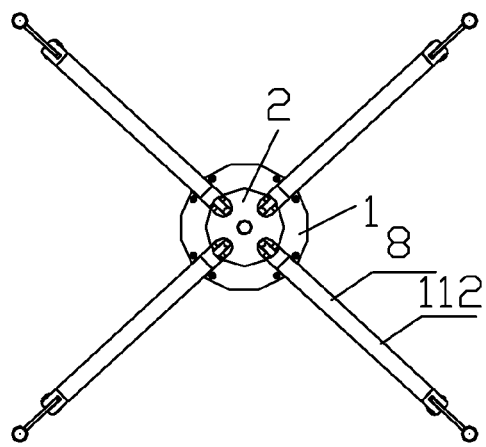
FIG. 2 is a lateral view of the present invention in an unfolded state.
Figure 3:
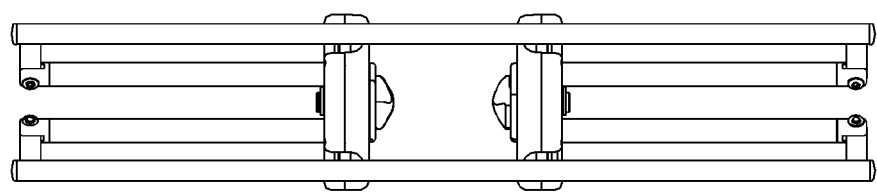
FIG. 3 is a structural schematic view of the present invention in a folded state.
Figure 4:
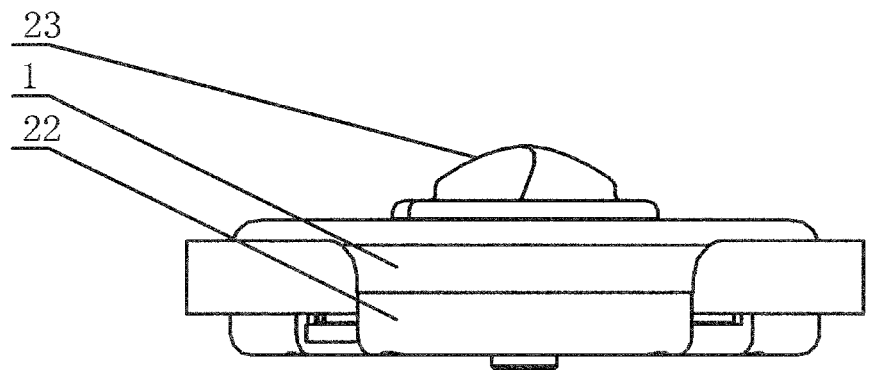
FIG. 4 is a front view of a pivot seat of the present invention.
Figure 5:
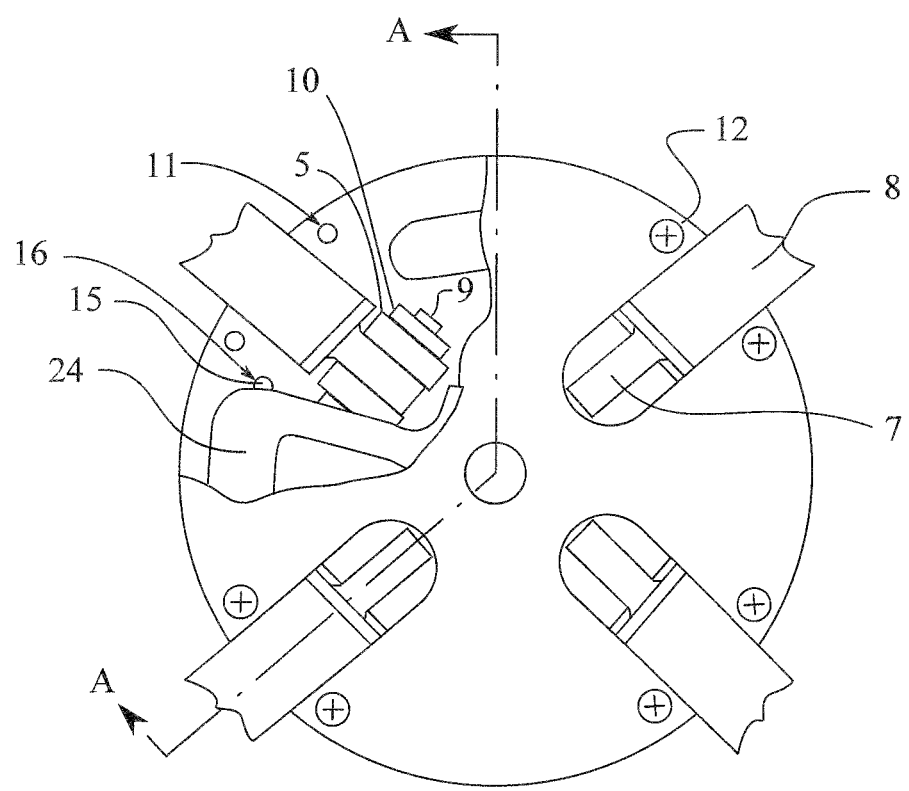
FIG. 5 is a structural schematic view of a pivot seat of the present invention.
Figure 6:
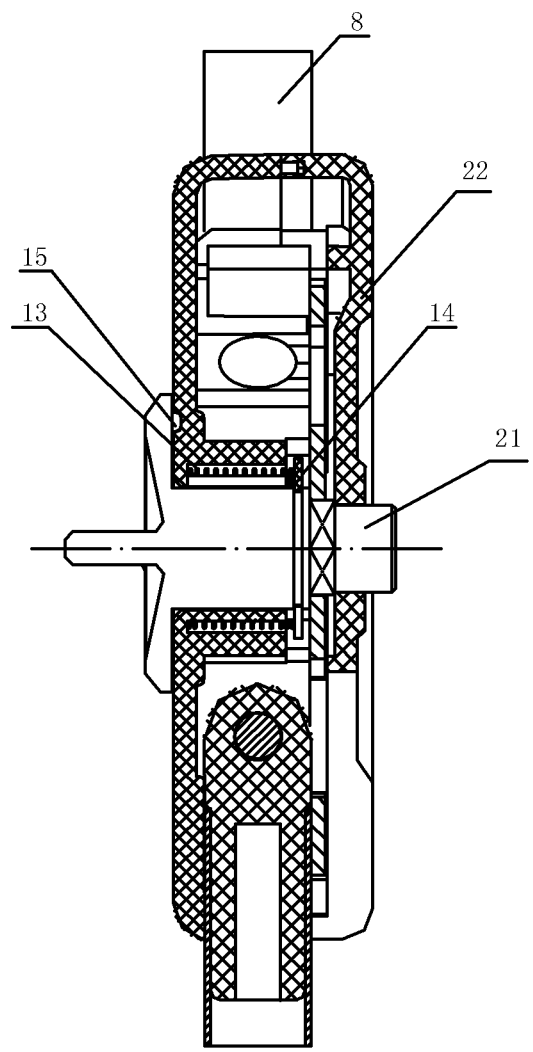
FIG. 6 is an A-A section view of FIG. 5.

| | |
|---|---|
| 1 | Pivot seat |
| 21 | Revolving shaft |
| 22 | Cover cap |
| 23 | Knob |
| 24 | Limiting turntable |
| 3 | Sliding sleeve |
| 31 | Compression spring |
| 32 | Movable block |
| 33 | Draw bar |
| 34 | Clip |
| 5 | Lug seat |
| 7 | Single-lug joint |
| 8 | Side brace |
| 9 | Pin |
| 10 | Shaft Stop collar |
| 11 | Screw hole |
| 12 | Bolt 1 |
| 3 | Spring |
| 14 | Large Stop collar |
| 15 | Locating pin |
| 16 | Locating hole |
| 17 | Slot |
| 18 | Button |
| 111 | Horizontal bars |
| 112 | Side bars |

DETAILED DESCRIPTION OF THE EMBODIMENT(S)

In the following detailed description, only certain exemplary embodiment(s) of the present invention are shown and described, by way of illustration. As those skilled in the art would recognize, the invention may be embodied in many different forms and should not be construed as being limited to the embodiment(s) set forth herein. Like reference numerals designate like elements throughout the specification.

Below the present invention is further described in details with reference to the drawings. As shown in the drawings, an embodiment of the present invention comprises horizontal bars 111, side bars 112 and pivot seats 1; the eight side bars 112 are divided into two groups, one end of each group of the four side bars 112 are coupled into an X shape through pivot seat 1. The other ends of the two groups of side bars 112 are hinged to the two ends of the four horizontal bars 111; the pivot seat 1 comprises a bowl-shaped base and a cover cap 22. The base and the cover cap 22 are connected with bolts 12 to form a space. Center holes are arranged at the center of the base and the center of cover cap 22 to allow the passage of the revolving shaft 21. The revolving shaft 21 runs through the center holes. A knob 23 is arranged at an inner end of the revolving shaft 21. A spring seat is arranged on revolving shaft 21. A spring 13 is disposed between the spring seat and the inner surface of the base. The acting force of spring 13 makes knob 23 be pressed tightly on the external surface of pivot seat 1; four pairs of lug seats 5 as connecting bases are disposed in the space between the base and the cover cap 22 and are intended to be connected with single-lug joints 7. They are connected and located with pins 9 through pin shafts. They are fixed with shaft stop collars 10 so as to prevent fall-off of the pin shafts. The four side braces 8 are hinged to lug supports 5 via single-lug joints 7. The four side bars 112 are arranged on side braces 8 and may revolve around lug seats 5; when the four side bars 112 are parallel with horizontal bars 111, they will be in a folded state; when the four side bars 112 are roughly perpendicular to the horizontal bars 111, they will be in an unfolded state. Four notches are arranged on the peripheral surface of the base and the peripheral surface and external surface of the cover cap 22 and allow the revolution of side bars 112, and the two ends of the notches also limit the side bars 112 when they are in an unfolded or a folded state; on the revolving shaft 21, a square wedge is installed, and on the wedge, a limiting turntable 24 is mounted. Four L-shape limiting clips are disposed around the limiting turntable 24;

When side bars 112 are in an unfolded state, knob 23 is rotated to drive the revolution of the revolving shaft 21 and the limiting turntable 24, making the front-end crossbar of the L-shaped limiting clip block the side plane of side bars 112 and stop the revolution of the side bars 112, thus realizing fixation of the bag rack; when the side bars 112 need to be folded, the knob 23 will be rotated to make the front-end crossbar of the L-shaped limiting clips stagger with the side bars 112, one end of the side bars 112 revolves around the connecting base and are folded. Moreover, the other end of the side bars 112 is revolved to make side bars 112 and horizontal bars 111 fold with each other. In this way, the entire bag rack can be folded like an umbrella.

Locating pins 15 and locating holes 16 are respectively arranged on the contact surface between the knob 23 and the pivot seat 1. Under the acting force of spring 13, locating pins 15 are inserted into locating holes 16, to guarantee the bag rack is stable when side bars 112 are in an unfolded state; while when side bars 112 are in a folded state, side bars 112 won't fall apart.

Figure 7:
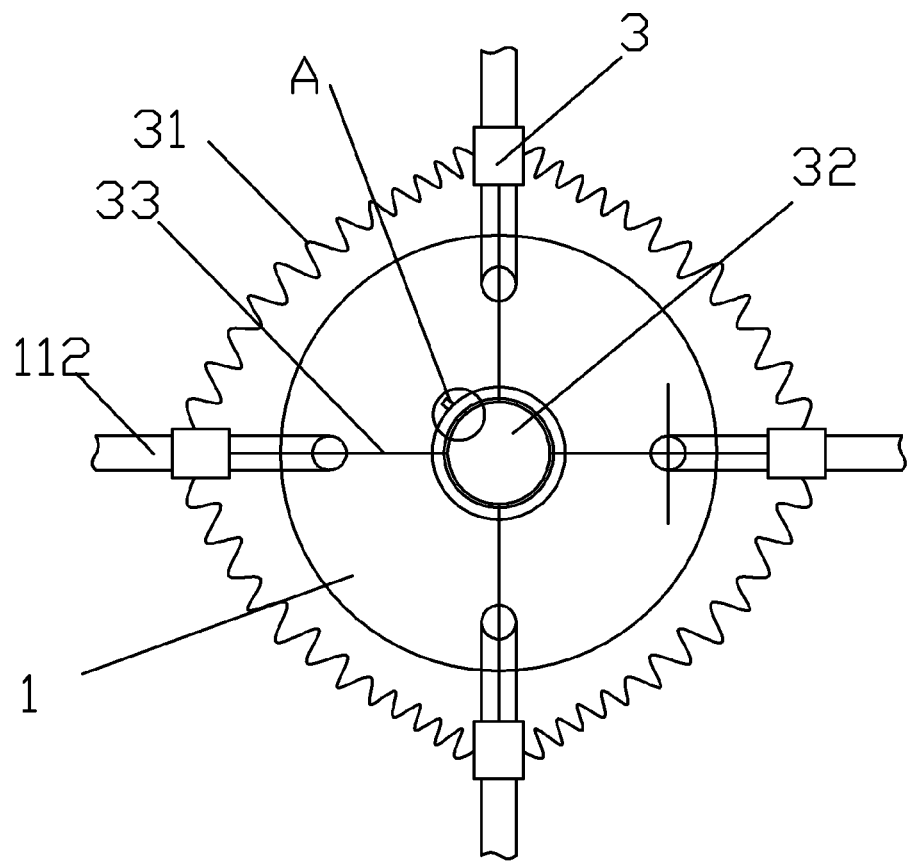
FIG. 7 is a schematic view for the connection of a pivot seat, a sliding sleeve and a spring.
Figure 8:
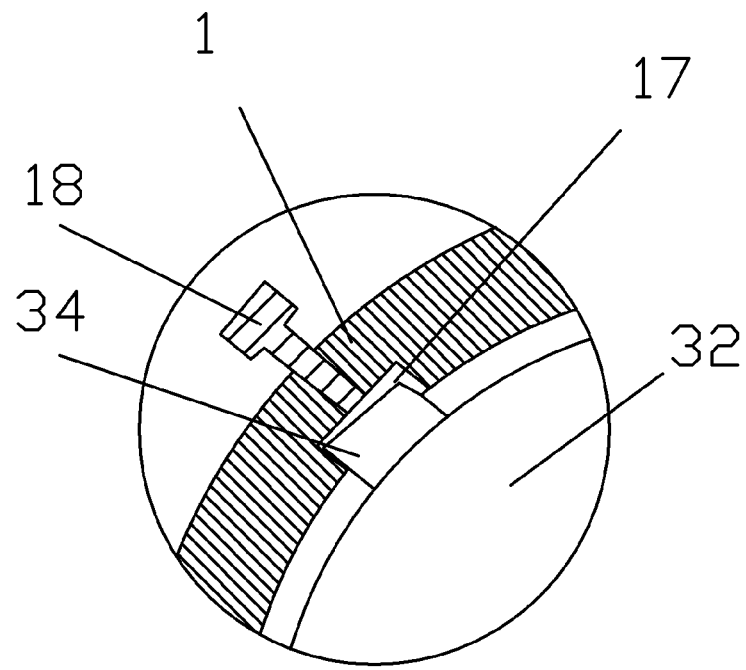
FIG. 8 is an enlarged schematic view of Part A of FIG. 7.

In order to further reduce volume, both horizontal bars 111 and side bars 112 of the present invention may adopt a plug-in type telescopic bar structure. In order to unfold or fold the bag rack in a more convenient manner, a movable block 32 may also be installed inside the pivot seat 1, as shown in FIG. 7 and FIG. 8. The movable block 32 is connected to the pivot seat 1 by utilizing a clip 34. Sliding sleeve 3 is disposed on side bars 112. The sliding sleeve 3 and the movable block 32 are connected with draw bars 33. Between sliding sleeves 3, a compression spring 31 is connected. To open the bag rack, the button on the pivot shaft should be pressed. Under the action of compression spring 31, the movable block 32 will be disengaged from pivot seat 1 and open the side bars 112 connected to sliding sleeves 3. To fold the bag rack, the movable block will be pulled until the movable block 32 locks the pivot seat 1.

In view of the foregoing, the present invention has a reasonable structure. The side bars are foldable and can also coincide with the horizontal bars. The volume of the pet bag rack will be reduced to facilitate transport and carrying when folded. The present invention is characterized by convenient use, easy processing and low cost.

While the present invention has been described in connection with certain exemplary embodiment(s), it is to be understood that the invention is not limited to the disclosed embodiments, but, on the contrary, is intended to cover various modifications and equivalent arrangements included within the spirit and scope of the appended claims, and equivalents thereof.

What is claimed is:

1. A pet bag rack, comprising:
   horizontal bars (111);
   two groups of relatively disposed side bars (112), with one end of each group of the side bars (112) being hinged to one end of the horizontal bars (111); and
   a pair of relatively disposed pivot seats (1), wherein:
   the other end of each group of the side bars (112) is pivoted to a pivot seat (1) of the pair of relatively disposed pivot seats,
   the pair of relative disposed pivot seats and the two groups of relatively disposed side bars together with the horizontal bars (111) form a unity, the side bars (112) being able to revolve around the pivot seat so as to adjust the side bars (112) to be parallel or be perpendicular to the horizontal bars (111), and
   on the pivot seat (1), a limiting and fixing device is also disposed to maintain the side bars (112) in an unfolded state or a folded state,
   wherein a sliding sleeve (3) is disposed on each side bar (112) in a slidable manner, a compression spring (31) is disposed between two adjoining sliding sleeves (3), a movable block (32) is arranged inside the pivot seat (1), the movable block (32) is connected to the sliding sleeves (3) with a draw bar (33), the pivot seat (1) also contains a slot (17), a clip (34) is disposed on the movable block (32), the clip (34) capable of being fastened inside the slot (17), and a button (18) that corresponds to the position of the slot (17) and is used to open the clip (34) is disposed on the outside of the pivot seat (1).

2. The pet bag rack according to claim 1, wherein the horizontal bars (111) are sleeve jointed telescopic bars, and the side bars (112) are sleeve jointed telescopic bars.

3. The pet bag rack according to claim 1, wherein the limiting and fixing device comprises a revolving shaft (21), a knob (23) and a limiting turntable (24), the revolving shaft (21) running through the center of the pivot seat (1), the knob (23) being arranged at the inner end of the revolving shaft (21), and the limiting turntable (24) is slipped over the revolving shaft (21).

4. The pet bag rack according to claim 1, wherein limiting clips are disposed around a limiting turntable (24), and locating pins (15) and locating holes (16) are arranged on a contact surface between a knob (23) and the pivot seat (1).

5. The pet bag rack according to claim 1, wherein a spring seat is disposed on a revolving shaft (21), a spring (13) is arranged between the spring seat and the pivot seat (1), and the spring (13) presses a knob (23) tightly onto the external surface of the pivot seat (1).

6. The pet bag rack according to claim 1, wherein the side bars comprise four side bars (112), and the four side bars are coupled into an X shape through the pivot seat (1).

7. The pet bag rack according to claim 1, wherein each group of the side bars comprises four side bars (112), and the four side bars are coupled into an X shape through the pivot seat (1).

8. A pet bag rack, comprising:
   horizontal bars (111); and
   two groups of relatively disposed side bars (112), with one end of each group of the side bars (112) being hinged to one end of the horizontal bars (111), wherein:
   the other end of each group of the side bars (112) is pivoted to a pivot seat (1),
   the pivot seat and the side bars together with the horizontal bars (111) form a unity, the side bars (112) being able to revolve around the pivot seat so as to adjust the side bars (112) to be parallel or be perpendicular to the horizontal bars (111), and
   on the pivot seat (1), a limiting and fixing device is also disposed to maintain the side bars (112) in an unfolded state or a folded state,
   wherein a sliding sleeve (3) is disposed on each side bar (112) in a slidable manner, a compression spring (31) is disposed between two adjoining sliding sleeves (3), a movable block (32) is arranged inside the pivot seat (1), the movable block (32) is connected to the sliding sleeves (3) with a draw bar (33), the pivot seat (1) also contains a slot (17), a clip (34) is disposed on the movable block (32), the clip (34) capable of being fastened inside the slot (17), and a button (18) that corresponds to the position of the slot (17) and is used to open the clip (34) is disposed on the outside of the pivot seat (1).

9. The pet bag rack according to claim 8, wherein the horizontal bars (111) are sleeve jointed telescopic bars, and the side bars (112) are sleeve jointed telescopic bars.

10. The pet bag rack according to claim 8, wherein the limiting and fixing device comprises a revolving shaft (21), a knob (23) and a limiting turntable (24), the revolving shaft (21) running through the center of the pivot seat (1), the knob (23) being arranged at the inner end of the revolving shaft (21), and the limiting turntable (24) is slipped over the revolving shaft (21).

11. The pet bag rack according to claim 8, wherein limiting clips are disposed around a limiting turntable (24), and locating pins (15) and locating holes (16) are arranged on a contact surface between a knob (23) and the pivot seat (1).

12. The pet bag rack according to claim 8, wherein a spring seat is disposed on a revolving shaft (21), a spring (13) is arranged between the spring seat and the pivot seat (1), and the spring (13) presses a knob (23) tightly onto the external surface of the pivot seat (1).

13. The pet bag rack according to claim 8, wherein the side bars comprise four side bars (112), and the four side bars are coupled into an X shape through the pivot seat (1).

14. The pet bag rack according to claim 8, wherein each group of the side bars comprises four side bars (112), and the four side bars are coupled into an X shape through the pivot seat (1).

* * * * *